United States Patent [19]

Crepy et al.

[11] Patent Number: 5,252,412
[45] Date of Patent: Oct. 12, 1993

[54] ACTIVATABLE LITHIUM/BROMINE TRIFLUORIDE ELECTROCHEMICAL CELL

[75] Inventors: Gilles Crepy, Evry; Jean-Pierre Buchel, Lisses, both of France

[73] Assignee: Alcatel Alsthom Compagnie Generale D' Electricite, Paris, France

[21] Appl. No.: 857,398

[22] Filed: Mar. 25, 1992

[30] Foreign Application Priority Data

Mar. 26, 1991 [FR] France ................... 91 03647

[51] Int. Cl.$^5$ ............................. H01M 2/40
[52] U.S. Cl. ......................... 429/70; 429/81; 429/199
[58] Field of Search ............ 429/70, 81, 196, 199

[56] References Cited

U.S. PATENT DOCUMENTS

| | | | |
|---|---|---|---|
| 3,427,207 | 2/1969 | Toy et al. | 429/196 |
| 3,840,405 | 10/1974 | Poirier D'Ange d'Orsay | |
| 4,038,460 | 7/1977 | Walsh et al. | 429/20 X |
| 4,200,684 | 4/1980 | Bro | |

FOREIGN PATENT DOCUMENTS 3633385 4/1988 Fed. Rep. of Germany .
WO84/03802 9/1984 PCT Int'l Appl. .
2056752 3/1981 United Kingdom ................ 429/196

OTHER PUBLICATIONS

Report, WGL-MLR-90-07, Order No. AD-225508, PP28, Aug. 21, 1990, Clarence, NY 14031, Christine A. Frysz et al.: Wilson Greatbatch Ltd.: 'Feasibility of a Super High Energy Density Battery of the Li/BrF$_3$ Electrochemical System'.

Primary Examiner—Stephen Kalafut
Attorney, Agent, or Firm—Sughrue, Mion, Zinn, Macpeak & Seas

[57] ABSTRACT

An activatable lithium/bromine trifluoride electrochemical cell comprising an anode of lithium or lithium alloy, a positive current collector based on carbon black, and an electrolyte based on bromine trifluoride, wherein the quantity of bromine trifluoride is not less than 200 ml per dm$^2$ of anode area, and that means are provided for causing the electrolyte to circulate through said cell at a linear speed of not less than 0.5 cm/second. Discharge yield is doubled [curve B] compared with a prior art cell [curve A].

4 Claims, 3 Drawing Sheets

ACTIVATABLE LITHIUM/BROMINE TRIFLUORIDE ELECTROCHEMICAL CELL

The present invention relates to an activatable lithium/bromine trifluoride electrochemical cell.

BACKGROUND OF THE INVENTION

In a very wide variety of applications there is a permanent demand for energy sources of ever increasing performance, having higher energy then primary cells having a liquid cathode of the thionyl chloride type.

Potentially the most advantageous electrochemical couple is the couple lithium/fluorine giving a theoretical potential of about 5.9 volts and a theoretical energy density of more than 5000 Wh/kg. However it is difficult to envisage using fluorine directly because of the major handling problems encountered. Fluorine is gaseous at ambient temperature and under atmospheric pressure and is extremely reactive.

In contrast, it is possible to envisage using fluorine in association with some other element giving compounds that are more easily handled at a temperature close to ambient temperature. This applies when fluorine is associated with a halogen, such as bromine, to obtain a compound that is liquid, such as bromine trifluoride, and which can be used as a catholyte in liquid cathode lithium primary cells.

The problem posed by such cells is that anode discharge is limited by a passivation phenomenon.

An object of the present invention is to mitigate this drawback.

SUMMARY OF THE INVENTION

The present invention provides an activatable lithium/bromine trifluoride electrochemical cell comprising an anode of lithium or lithium alloy, a positive current collector based on carbon black, and an electrolyte based on bromine trifluoride, wherein the quantity of bromine trifluoride is not less than 200 ml per $dm^2$ of anode area, and that means are provided for causing the electrolyte to circulate through said cell at a linear speed of not less than 0.5 cm/second, thereby preventing anode reaction products such as LiF and/or $LiBrF_4$ precipitating.

The bromine trifluoride may contain at least one soluble compound such as lithium trifluoromethane sulfonate at a concentration lying in the range $10^{-2}$ moles per liter to 1 mole per liter.

By way of example, said means may comprise a PTFE pump external to the cell.

The dispositions of the present invention make it possible to avoid lithium discharge being limited, and consequently nearly all of the lithium (80% to 90%) can be used. This doubles the discharge yield of the cell.

BRIEF DESCRIPTION OF THE DRAWINGS

Embodiments of the invention are described by way of example with reference to the accompanying drawings, in which.

DETAILED DESCRIPTION

Two cells A and B were prepared comprising:
a lithium anode;
an electrolyte based on bromine trifluoride, and including a compound such as lithium trifluoromethane sulfonate at a concentration of 0.1 moles per liter, there being 200 ml of electrolyte per $dm^2$ of anode area; and
a cathode current collector made of porous carbon.

Those cells did not contain conventional separators such as organic or inorganic felts. The interelectrode distance which was about 1 mm was maintained by Teflon studs, having a diameter of 1 mm and a thickness of 1 mm.

Figure 1:
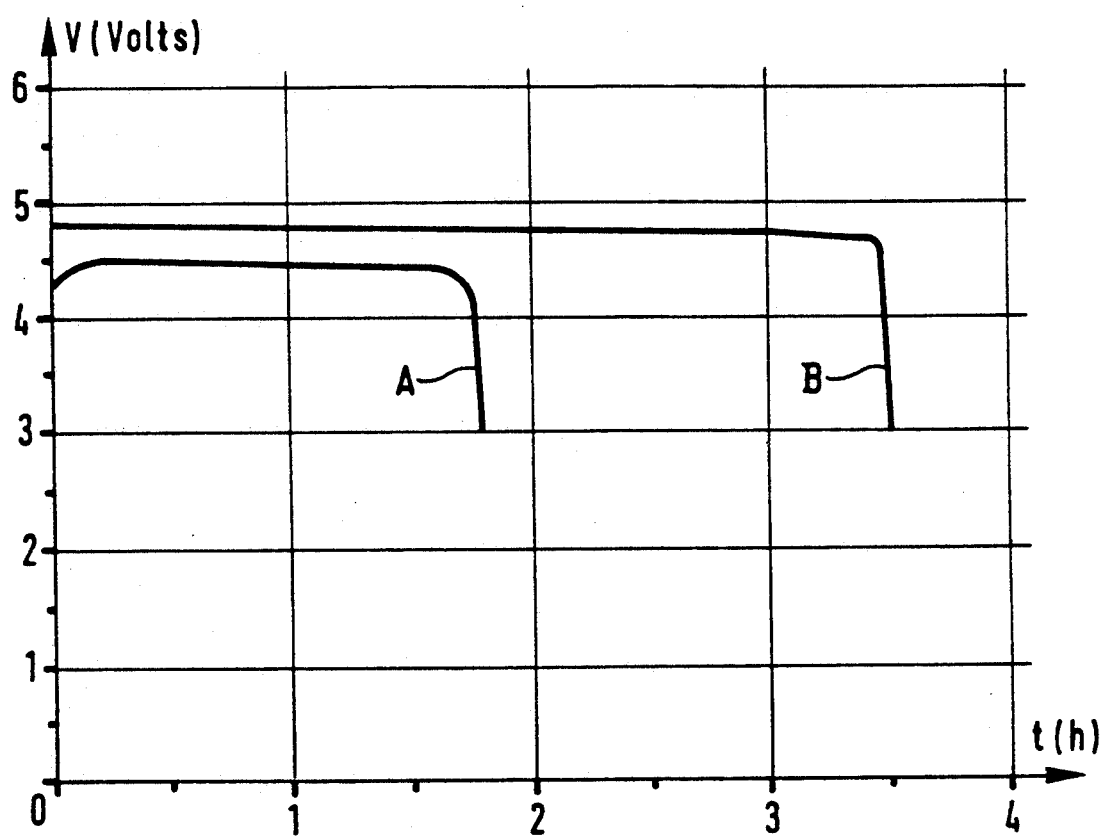
FIG. 1 is a graph showing discharge curves of V (volts) plotted as a function of t (in hours) for two activated lithium/bromine trifluoride cells, one without electrolyte circulation and the other with electrolyte circulation in accordance with the invention.

After activation, the cell A was discharged at 10 $mA/cm^2$. Curve A of FIG. 1 was obtained.

Figure 3:
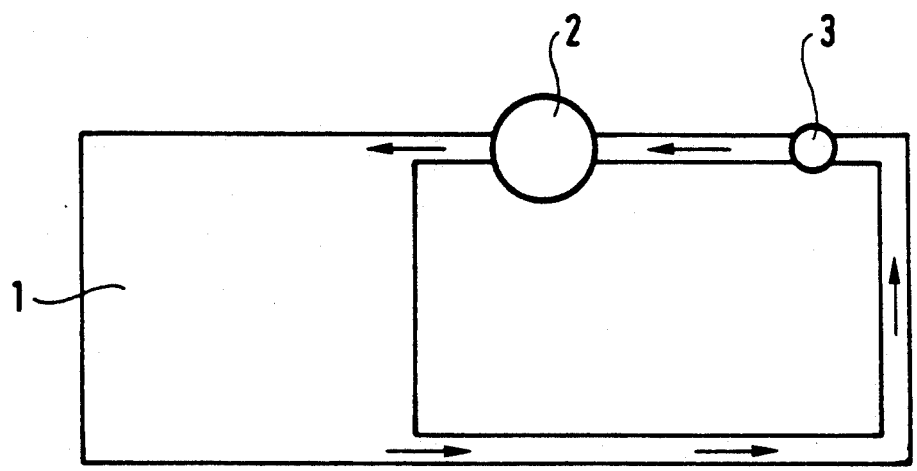
FIG. 3 is a schematic view of a cell subjected to electrolyte circulated by a pump external of the cell in accordance with FIG. 1.

Cell B was, FIG. 3 associated with a pump 2 within loop 4, external of the cell B and being made of PTFE to cause the electrolyte E to circulate inside the cell at a linear speed of 0.5 cm per second controlled by a valve 3 within the loop 4. It was discharged under the same conditions as cell A, thereby obtaining curve B. The discharge yield was thus doubled, and the faraday efficiency of the lithium anode reached 80%. The discharge potential was 4.8 volts during 3.5 hours.

Figure 2:
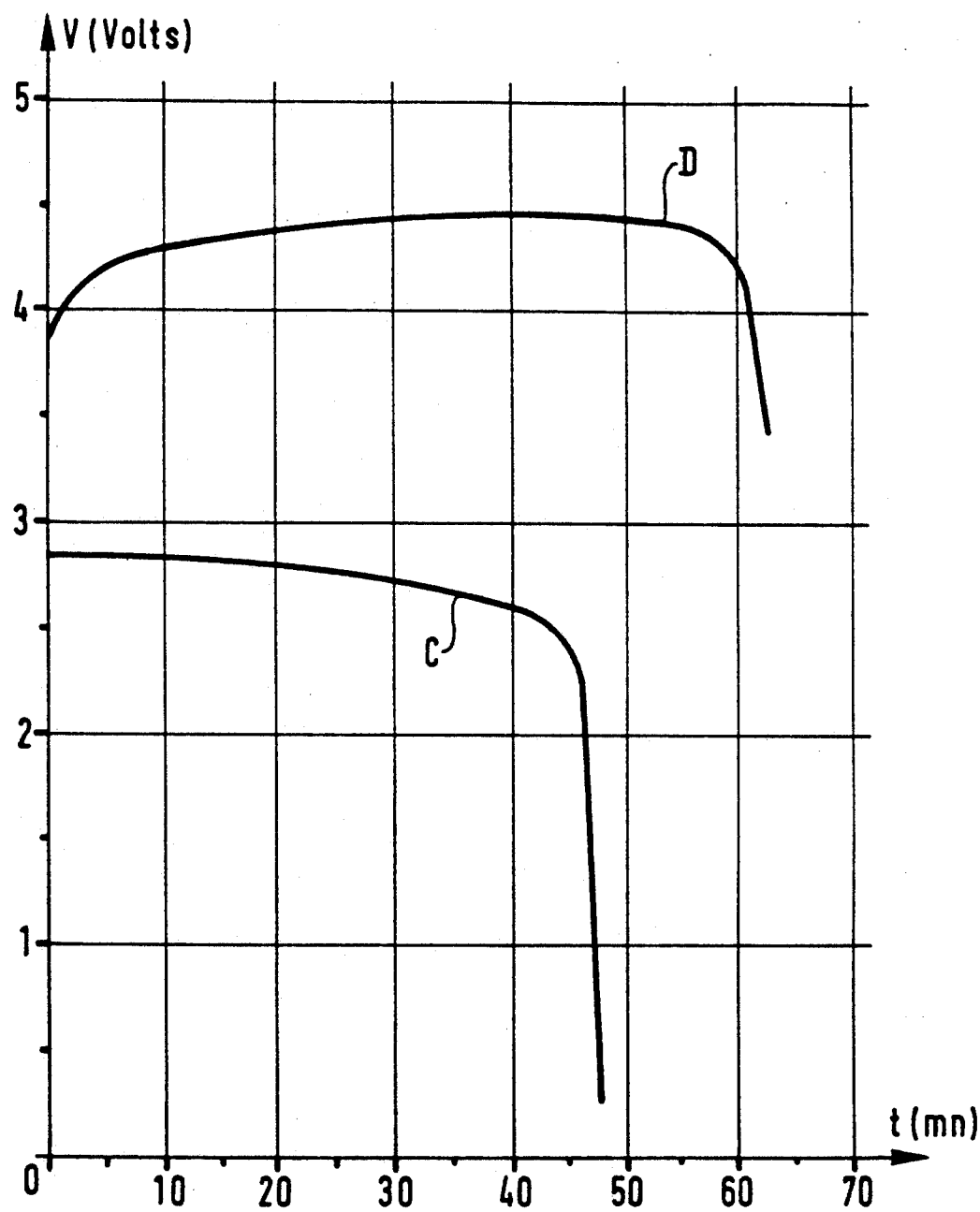
FIG. 2 shows discharge curves of V (volts) plotted as a function of t (in minutes) for a prior art $Li/SOCl_2$ cell and for a cell of the invention.

Thereafter, an $Li/SOCl_2$ type prior art cell C was discharged at 25 $mA/cm^2$, as was a cell D of the invention and analogous to the cell B. The corresponding discharge curves are given in FIG. 2.

It can be seen that the increase in discharge potential was of the order of 50% and that the increase in discharge time under high current density was of the order of 30%.

These results give rise to twice the energy density per unit volume and to a 60% increase in power per unit volume for the cell of the invention compared with the $Li/SOCl_2$ cell.

Naturally, the invention is not limited to the embodiment described above. Thus, bromine trifluoride can be used on its own, or together with additives other than that specified above.

We claim:

1. An activatable lithium/bromine trifluoride electrochemical cell comprising an anode of lithium or lithium alloy, a positive current collector based on carbon black, and an electrolyte based on bromine trifluoride, wherein the quantity of bromine trifluoride is not less than 200 ml per $dm^2$ of anode area, and that means are provided for causing the electrolyte to circulate through said cell at a linear speed of not less than 0.5 cm/second, thereby preventing anode reaction products from precipitating.

2. A cell according to claim 1, wherein said means comprise a pump made of PTFE and external to the cell.

3. An electrochemical cell according to claim 1, wherein said bromine trifluoride contains at least one additive at a concentration lying in the range $10^{-2}$ moles per liter to 1 mole per liter.

4. An electrochemical cell according to claim 3, wherein said additive is lithium trifluoromethane sulfonate.

* * * * *